United States Patent
Shigeta et al.

[11] Patent Number: 6,088,012
[45] Date of Patent: Jul. 11, 2000

[54] HALF TONE DISPLAY METHOD FOR A DISPLAY PANEL

[75] Inventors: Tetsuya Shigeta; Hitoshi Mochizuki, both of Yamanashi-ken, Japan

[73] Assignee: Pioneer Electronic Corporation, Tokyo, Japan

[21] Appl. No.: 09/060,365

[22] Filed: Apr. 15, 1998

[30] Foreign Application Priority Data

Apr. 26, 1997 [JP] Japan ................................ 9-123537

[51] Int. Cl.$^7$ .................................................. H04N 5/202
[52] U.S. Cl. .............................. 345/63; 345/89; 345/77; 345/147; 348/201
[58] Field of Search .............................. 345/63, 89, 77, 345/147; 348/201

[56] References Cited

U.S. PATENT DOCUMENTS

| | | | |
|---|---|---|---|
| 4,009,330 | 2/1977 | Cutler et al. | 348/701 |
| 5,541,618 | 7/1996 | Hinoda | 345/60 |
| 5,724,054 | 3/1998 | Shinoda | 345/60 |
| 5,874,932 | 2/1999 | Nagaoka et al. | 345/60 |
| 5,907,316 | 5/1999 | Mikoshiba et al. | 345/147 |
| 5,940,142 | 8/1999 | Wakitani et al. | 348/671 |
| 5,943,032 | 8/1999 | Nagaoka et al. | 345/63 |

*Primary Examiner*—Bipin Shalwala
*Assistant Examiner*—Vincent E. Kovalick
*Attorney, Agent, or Firm*—Arent, Fox Kintner Plotkin & Kahn

[57] ABSTRACT

Kinds of an input video signal is discriminated. Sub-frames are disposed in such an arrangement that a sub-frame corresponding to a most heavy weight bit is located at a central portion of the unit display period, and sub-frames, each of which corresponds to a lighter weight bit than the most heavy weight bit, are disposed at positions before and after the most heavy sub-frame when the input video signal is discriminated as a still picture. Each of sub-frames which correspond to heavy weight bits including a most heavy weight bit is divided into two small sub-frames. The sub-frames are disposed in such an arrangement that small sub-frames corresponding to the most heavy weight bit are located at portions of the unit display period, small sub-frames, each of which corresponds to a lighter weight bit than the most heavy weight bit, at positions before and after the most heavy sub-frame when the input video signal is discriminated as a moving picture.

4 Claims, 21 Drawing Sheets

FIG.4 a

HIGH-FIGURE 4 BITS DIVIDED – A FIRST CONVERTING TABLE

| LUMINANCE LEVEL | IMPUT PIVEL DATA | | | | | | | | | | | |
|---|---|---|---|---|---|---|---|---|---|---|---|---|
| | DB | DA | D9 | D8 | D7 | D6 | D5 | D4 | D3 | D2 | D1 | D0 | |
| | 64 | 64 | 32 | 32 | 16 | 16 | 8 | 8 | 8 | 4 | 2 | 1 | hex |
| 001 | | | | | | | | | | | | 1 | 001 |
| 002 | | | | | | | | | | | 1 | | 002 |
| 003 | | | | | | | | | | | 1 | 1 | 003 |
| 004 | | | | | | | | | | 1 | | | 004 |
| 005 | | | | | | | | | | 1 | | 1 | 005 |
| 006 | | | | | | | | | | 1 | 1 | | 006 |
| 007 | | | | | | | | | | 1 | 1 | 1 | 007 |
| 008 | | | | | | | | | 1 | | | | 008 |
| 009 | | | | | | | | | 1 | | | 1 | 009 |
| 010 | | | | | | | | | 1 | | 1 | | 00A |
| 011 | | | | | | | | | 1 | | 1 | 1 | 00B |
| 012 | | | | | | | | | 1 | 1 | | | 00C |
| 013 | | | | | | | | | 1 | 1 | | 1 | 00D |
| 014 | | | | | | | | | 1 | 1 | 1 | | 00E |
| 015 | | | | | | | | | 1 | 1 | 1 | 1 | 00F |
| 016 | | | | | | | | 1 | 1 | | | | 018 |
| 017 | | | | | | | | 1 | 1 | | | 1 | 019 |
| 018 | | | | | | | | 1 | 1 | | 1 | | 01A |
| 019 | | | | | | | | 1 | 1 | | 1 | 1 | 01B |
| 020 | | | | | | | | 1 | 1 | 1 | | | 01C |
| 021 | | | | | | | | 1 | 1 | 1 | | 1 | 01D |
| 022 | | | | | | | | 1 | 1 | 1 | 1 | | 01E |
| 023 | | | | | | | | 1 | 1 | 1 | 1 | 1 | 01F |
| 024 | | | | | | | 1 | 1 | 1 | | | | 038 |
| 025 | | | | | | | 1 | 1 | 1 | | | 1 | 039 |
| 026 | | | | | | | 1 | 1 | 1 | | 1 | | 03A |
| 027 | | | | | | | 1 | 1 | 1 | | 1 | 1 | 03B |
| 028 | | | | | | | 1 | 1 | 1 | 1 | | | 03C |
| 029 | | | | | | | 1 | 1 | 1 | 1 | | 1 | 03D |
| 030 | | | | | | | 1 | 1 | 1 | 1 | 1 | | 03E |
| 031 | | | | | | | 1 | 1 | 1 | 1 | 1 | 1 | 03F |

FIG.4 b

| | 1 | 2 | 3 | 4 | 5 | 6 | 7 | 8 | 9 | 10 | 11 | |
|---|---|---|---|---|---|---|---|---|---|---|---|---|
| 032 | | | | | | 1 | | 1 | 1 | | | 058 |
| 033 | | | | | | 1 | | 1 | 1 | | 1 | 059 |
| 034 | | | | | | 1 | | 1 | 1 | 1 | | 05A |
| 035 | | | | | | 1 | | 1 | 1 | 1 | 1 | 05B |
| 036 | | | | | | 1 | | 1 | 1 | 1 | | 05C |
| 037 | | | | | | 1 | | 1 | 1 | 1 | 1 | 05D |
| 038 | | | | | | 1 | | 1 | 1 | 1 | | 05E |
| 039 | | | | | | 1 | | 1 | 1 | 1 | 1 | 05F |
| 040 | | | | 1 | 1 | | | 1 | | | | 0C8 |
| 041 | | | | 1 | 1 | | | 1 | | | 1 | 0C9 |
| 042 | | | | 1 | 1 | | | 1 | | 1 | | 0CA |
| 043 | | | | 1 | 1 | | | 1 | | 1 | 1 | 0CB |
| 044 | | | | 1 | 1 | | | 1 | 1 | | | 0CC |
| 045 | | | | 1 | 1 | | | 1 | 1 | | 1 | 0CD |
| 046 | | | | 1 | 1 | | | 1 | 1 | 1 | | 0CE |
| 047 | | | | 1 | 1 | | | 1 | 1 | 1 | 1 | 0CF |
| 048 | | | 1 | | 1 | | | | | | | 140 |
| 049 | | | 1 | | 1 | | | | | | 1 | 141 |
| 050 | | | 1 | | 1 | | | | | 1 | | 142 |
| 051 | | | 1 | | 1 | | | | | 1 | 1 | 143 |
| 052 | | | 1 | | 1 | | | | 1 | | | 144 |
| 053 | | | 1 | | 1 | | | | 1 | | 1 | 145 |
| 054 | | | 1 | | 1 | | | | 1 | 1 | | 146 |
| 055 | | | 1 | | 1 | | | | 1 | 1 | 1 | 147 |
| 056 | | | 1 | | 1 | | 1 | | | | | 148 |
| 057 | | | 1 | | 1 | | 1 | | | | 1 | 149 |
| 058 | | | 1 | | 1 | | 1 | | | 1 | | 14A |
| 059 | | | 1 | | 1 | | 1 | | | 1 | 1 | 14B |
| 060 | | | 1 | | 1 | | 1 | | 1 | | | 14C |
| 061 | | | 1 | | 1 | | 1 | | 1 | | 1 | 14D |
| 062 | | | 1 | | 1 | | 1 | | 1 | 1 | | 14E |
| 063 | | | 1 | | 1 | | 1 | | 1 | 1 | 1 | 14F |

FIG.5 a

HIGH-FIGURE 4 BITS DIVIDED – A FIRST CONVERTING TABLE

| LUMINANCE LEVEL | IMPUT PIVEL DATA | | | | | | | | | | | | |
|---|---|---|---|---|---|---|---|---|---|---|---|---|---|
| | DB | DA | D9 | D8 | D7 | D6 | D5 | D4 | D3 | D2 | D1 | D0 | |
| | 64 | 64 | 32 | 32 | 16 | 16 | 8 | 8 | 8 | 4 | 2 | 1 | hex |
| 064 |  |  |  | 1 |  | 1 |  | 1 | 1 |  |  |  | 158 |
| 065 |  |  |  | 1 |  | 1 |  | 1 | 1 |  |  | 1 | 159 |
| 066 |  |  |  | 1 |  | 1 |  | 1 | 1 |  | 1 |  | 15A |
| 067 |  |  |  | 1 |  | 1 |  | 1 | 1 |  | 1 | 1 | 15B |
| 068 |  |  |  | 1 |  | 1 |  | 1 | 1 | 1 |  |  | 15C |
| 069 |  |  |  | 1 |  | 1 |  | 1 | 1 | 1 |  | 1 | 15D |
| 070 |  |  |  | 1 |  | 1 |  | 1 | 1 | 1 | 1 |  | 15E |
| 071 |  |  |  | 1 |  | 1 |  | 1 | 1 | 1 | 1 | 1 | 15F |
| 072 |  |  |  | 1 |  | 1 | 1 | 1 | 1 |  |  |  | 178 |
| 073 |  |  |  | 1 |  | 1 | 1 | 1 | 1 |  |  | 1 | 179 |
| 074 |  |  |  | 1 |  | 1 | 1 | 1 | 1 |  | 1 |  | 17A |
| 075 |  |  |  | 1 |  | 1 | 1 | 1 | 1 |  | 1 | 1 | 17B |
| 076 |  |  |  | 1 |  | 1 | 1 | 1 | 1 | 1 |  |  | 17C |
| 077 |  |  |  | 1 |  | 1 | 1 | 1 | 1 | 1 |  | 1 | 17D |
| 078 |  |  |  | 1 |  | 1 | 1 | 1 | 1 | 1 | 1 |  | 17E |
| 079 |  |  |  | 1 |  | 1 | 1 | 1 | 1 | 1 | 1 | 1 | 17F |
| 080 |  |  | 1 | 1 |  |  | 1 | 1 |  |  |  |  | 330 |
| 081 |  |  | 1 | 1 |  |  | 1 | 1 |  |  |  | 1 | 331 |
| 082 |  |  | 1 | 1 |  |  | 1 | 1 |  |  | 1 |  | 332 |
| 083 |  |  | 1 | 1 |  |  | 1 | 1 |  |  | 1 | 1 | 333 |
| 084 |  |  | 1 | 1 |  |  | 1 | 1 |  | 1 |  |  | 334 |
| 085 |  |  | 1 | 1 |  |  | 1 | 1 |  | 1 |  | 1 | 335 |
| 086 |  |  | 1 | 1 |  |  | 1 | 1 |  | 1 | 1 |  | 336 |
| 087 |  |  | 1 | 1 |  |  | 1 | 1 |  | 1 | 1 | 1 | 337 |
| 088 |  |  | 1 | 1 |  |  | 1 | 1 | 1 |  |  |  | 338 |
| 089 |  |  | 1 | 1 |  |  | 1 | 1 | 1 |  |  | 1 | 339 |
| 090 |  |  | 1 | 1 |  |  | 1 | 1 | 1 |  | 1 |  | 33A |
| 091 |  |  | 1 | 1 |  |  | 1 | 1 | 1 |  | 1 | 1 | 33B |
| 092 |  |  | 1 | 1 |  |  | 1 | 1 | 1 | 1 |  |  | 33C |
| 093 |  |  | 1 | 1 |  |  | 1 | 1 | 1 | 1 |  | 1 | 33D |
| 094 |  |  | 1 | 1 |  |  | 1 | 1 | 1 | 1 | 1 |  | 33E |
| 095 |  |  | 1 | 1 |  |  | 1 | 1 | 1 | 1 | 1 | 1 | 33F |

FIG.5 b

| Dec | | | | | | | | | | | Hex |
|---|---|---|---|---|---|---|---|---|---|---|---|
| 096 | | | 1 | 1 | | 1 | | 1 | 1 | | | 358 |
| 097 | | | 1 | 1 | | 1 | | 1 | 1 | | 1 | 359 |
| 098 | | | 1 | 1 | | 1 | | 1 | 1 | 1 | | 35A |
| 099 | | | 1 | 1 | | 1 | | 1 | 1 | 1 | 1 | 35B |
| 100 | | | 1 | 1 | | 1 | | 1 | 1 | | 1 | | 35C |
| 101 | | | 1 | 1 | | 1 | | 1 | 1 | 1 | | 1 | 35D |
| 102 | | | 1 | 1 | | 1 | | 1 | 1 | 1 | 1 | | 35E |
| 103 | | | 1 | 1 | | 1 | | 1 | 1 | 1 | 1 | 1 | 35F |
| 104 | | 1 | 1 | 1 | 1 | | | 1 | | | | | 3C8 |
| 105 | | 1 | 1 | 1 | 1 | | | 1 | | | 1 | 3C9 |
| 106 | | 1 | 1 | 1 | 1 | | | 1 | | 1 | | 3CA |
| 107 | | 1 | 1 | 1 | 1 | | | 1 | | 1 | 1 | 3CB |
| 108 | | 1 | 1 | 1 | 1 | | | 1 | 1 | | | 3CC |
| 109 | | 1 | 1 | 1 | 1 | | | 1 | 1 | | 1 | 3CD |
| 110 | | 1 | 1 | 1 | 1 | | | 1 | 1 | 1 | | 3CE |
| 111 | | 1 | 1 | 1 | 1 | | | 1 | 1 | 1 | 1 | 3CF |
| 112 | 1 | | 1 | | | 1 | 1 | | | | | 530 |
| 113 | 1 | | 1 | | | 1 | 1 | | | | 1 | 531 |
| 114 | 1 | | 1 | | | 1 | 1 | | | 1 | | 532 |
| 115 | 1 | | 1 | | | 1 | 1 | | | 1 | 1 | 533 |
| 116 | 1 | | 1 | | | 1 | 1 | | 1 | | | 534 |
| 117 | 1 | | 1 | | | 1 | 1 | | 1 | | 1 | 535 |
| 118 | 1 | | 1 | | | 1 | 1 | | 1 | 1 | | 536 |
| 119 | 1 | | 1 | | | 1 | 1 | | 1 | 1 | 1 | 537 |
| 120 | 1 | | 1 | | | 1 | 1 | 1 | | | | 538 |
| 121 | 1 | | 1 | | | 1 | 1 | 1 | | | 1 | 539 |
| 122 | 1 | | 1 | | | 1 | 1 | 1 | | 1 | | 53A |
| 123 | 1 | | 1 | | | 1 | 1 | 1 | | 1 | 1 | 53B |
| 124 | 1 | | 1 | | | 1 | 1 | 1 | 1 | | | 53C |
| 125 | 1 | | 1 | | | 1 | 1 | 1 | 1 | | 1 | 53D |
| 126 | 1 | | 1 | | | 1 | 1 | 1 | 1 | 1 | | 53E |
| 127 | 1 | | 1 | | | 1 | 1 | 1 | 1 | 1 | 1 | 53F |

FIG.6 a

HIGH-FIGURE 4 BITS DIVIDED – A FIRST CONVERTING TABLE

| LUMINANCE LEVEL | IMPUT PIVEL DATA | | | | | | | | | | | | |
|---|---|---|---|---|---|---|---|---|---|---|---|---|---|
| | DB | DA | D9 | D8 | D7 | D6 | D5 | D4 | D3 | D2 | D1 | D0 | |
| | 64 | 64 | 32 | 32 | 16 | 16 | 8 | 8 | 8 | 4 | 2 | 1 | hex |
| 128 | | 1 | | 1 | 1 | 1 | | | | | | | 5C0 |
| 129 | | 1 | | 1 | 1 | 1 | | | | | | 1 | 5C1 |
| 130 | | 1 | | 1 | 1 | 1 | | | | | 1 | | 5C2 |
| 131 | | 1 | | 1 | 1 | 1 | | | | | 1 | 1 | 5C3 |
| 132 | | 1 | | 1 | 1 | 1 | | | | 1 | | | 5C4 |
| 133 | | 1 | | 1 | 1 | 1 | | | | 1 | | 1 | 5C5 |
| 134 | | 1 | | 1 | 1 | 1 | | | | 1 | 1 | | 5C6 |
| 135 | | 1 | | 1 | 1 | 1 | | | | 1 | 1 | 1 | 5C7 |
| 136 | | 1 | | 1 | 1 | 1 | | 1 | | | | | 5D0 |
| 137 | | 1 | | 1 | 1 | 1 | | 1 | | | | 1 | 5D1 |
| 138 | | 1 | | 1 | 1 | 1 | | 1 | | | 1 | | 5D2 |
| 139 | | 1 | | 1 | 1 | 1 | | 1 | | | 1 | 1 | 5D3 |
| 140 | | 1 | | 1 | 1 | 1 | | 1 | | 1 | | | 5D4 |
| 141 | | 1 | | 1 | 1 | 1 | | 1 | | 1 | | 1 | 5D5 |
| 142 | | 1 | | 1 | 1 | 1 | | 1 | | 1 | 1 | | 5D6 |
| 143 | | 1 | | 1 | 1 | 1 | | 1 | | 1 | 1 | 1 | 5D7 |
| 144 | | 1 | | 1 | 1 | 1 | 1 | 1 | | | | | 5F0 |
| 145 | | 1 | | 1 | 1 | 1 | 1 | 1 | | | | 1 | 5F1 |
| 146 | | 1 | | 1 | 1 | 1 | 1 | 1 | | | 1 | | 5F2 |
| 147 | | 1 | | 1 | 1 | 1 | 1 | 1 | | | 1 | 1 | 5F3 |
| 148 | | 1 | | 1 | 1 | 1 | 1 | 1 | | 1 | | | 5F4 |
| 149 | | 1 | | 1 | 1 | 1 | 1 | 1 | | 1 | | 1 | 5F5 |
| 150 | | 1 | | 1 | 1 | 1 | 1 | 1 | | 1 | 1 | | 5F6 |
| 151 | | 1 | | 1 | 1 | 1 | 1 | 1 | | 1 | 1 | 1 | 5F7 |
| 152 | | 1 | | 1 | 1 | 1 | 1 | 1 | 1 | | | | 5F8 |
| 153 | | 1 | | 1 | 1 | 1 | 1 | 1 | 1 | | | 1 | 5F9 |
| 154 | | 1 | | 1 | 1 | 1 | 1 | 1 | 1 | | 1 | | 5FA |
| 155 | | 1 | | 1 | 1 | 1 | 1 | 1 | 1 | | 1 | 1 | 5FB |
| 156 | | 1 | | 1 | 1 | 1 | 1 | 1 | 1 | 1 | | | 5FC |
| 157 | | 1 | | 1 | 1 | 1 | 1 | 1 | 1 | 1 | | 1 | 5FD |
| 158 | | 1 | | 1 | 1 | 1 | 1 | 1 | 1 | 1 | 1 | | 5FE |
| 159 | | 1 | | 1 | 1 | 1 | 1 | 1 | 1 | 1 | 1 | 1 | 5FF |

FIG.6 b

| | | | | | | | | | | | | | |
|---|---|---|---|---|---|---|---|---|---|---|---|---|---|
| 160 | 1 | 1 | | | 1 | 1 | | | | | | | | CC0 |
| 161 | 1 | 1 | | | 1 | 1 | | | | | | | 1 | CC1 |
| 162 | 1 | 1 | | | 1 | 1 | | | | | | 1 | | CC2 |
| 163 | 1 | 1 | | | 1 | 1 | | | | | | 1 | 1 | CC3 |
| 164 | 1 | 1 | | | 1 | 1 | | | | | 1 | | | CC4 |
| 165 | 1 | 1 | | | 1 | 1 | | | | | 1 | | 1 | CC5 |
| 166 | 1 | 1 | | | 1 | 1 | | | | | 1 | 1 | | CC6 |
| 167 | 1 | 1 | | | 1 | 1 | | | | | 1 | 1 | 1 | CC7 |
| 168 | 1 | 1 | | | 1 | 1 | | | 1 | | | | | CC8 |
| 169 | 1 | 1 | | | 1 | 1 | | | 1 | | | | 1 | CC9 |
| 170 | 1 | 1 | | | 1 | 1 | | | 1 | | | 1 | | CCA |
| 171 | 1 | 1 | | | 1 | 1 | | | 1 | | | 1 | 1 | CCB |
| 172 | 1 | 1 | | | 1 | 1 | | | 1 | | 1 | | | CCC |
| 173 | 1 | 1 | | | 1 | 1 | | | 1 | | 1 | | 1 | CCD |
| 174 | 1 | 1 | | | 1 | 1 | | | 1 | | 1 | 1 | | CCE |
| 175 | 1 | 1 | | | 1 | 1 | | | 1 | | 1 | 1 | 1 | CCF |
| 176 | 1 | 1 | | | 1 | 1 | | 1 | 1 | | | | | CD8 |
| 177 | 1 | 1 | | | 1 | 1 | | 1 | 1 | | | | 1 | CD9 |
| 178 | 1 | 1 | | | 1 | 1 | | 1 | 1 | | | 1 | | CDA |
| 179 | 1 | 1 | | | 1 | 1 | | 1 | 1 | | | 1 | 1 | CDB |
| 180 | 1 | 1 | | | 1 | 1 | | 1 | 1 | | 1 | | | CDC |
| 181 | 1 | 1 | | | 1 | 1 | | 1 | 1 | | 1 | | 1 | CDD |
| 182 | 1 | 1 | | | 1 | 1 | | 1 | 1 | | 1 | 1 | | CDE |
| 183 | 1 | 1 | | | 1 | 1 | | 1 | 1 | | 1 | 1 | 1 | CDF |
| 184 | 1 | 1 | | | 1 | 1 | 1 | 1 | 1 | | | | | CF8 |
| 185 | 1 | 1 | | | 1 | 1 | 1 | 1 | 1 | | | | 1 | CF9 |
| 186 | 1 | 1 | | | 1 | 1 | 1 | 1 | 1 | | | 1 | | CFA |
| 187 | 1 | 1 | | | 1 | 1 | 1 | 1 | 1 | | | 1 | 1 | CFB |
| 188 | 1 | 1 | | | 1 | 1 | 1 | 1 | 1 | | 1 | | | CFC |
| 189 | 1 | 1 | | | 1 | 1 | 1 | 1 | 1 | | 1 | | 1 | CFD |
| 190 | 1 | 1 | | | 1 | 1 | 1 | 1 | 1 | | 1 | 1 | | CFE |
| 191 | 1 | 1 | | | 1 | 1 | 1 | 1 | 1 | | 1 | 1 | 1 | CFF |

FIG.7 a

HIGH-FIGURE 4 BITS DIVIDED – A FIRST CONVERTING TABLE

| LUMINANCE LEVEL | IMPUT PIVEL DATA | | | | | | | | | | | | |
|---|---|---|---|---|---|---|---|---|---|---|---|---|---|
| | DB | DA | D9 | D8 | D7 | D6 | D5 | D4 | D3 | D2 | D1 | D0 | |
| | 64 | 64 | 32 | 32 | 16 | 16 | 8 | 8 | 8 | 4 | 2 | 1 | hex |
| 192 | 1 | 1 | | 1 | | 1 | 1 | 1 | | | | | D70 |
| 193 | 1 | 1 | | 1 | | 1 | 1 | 1 | | | | 1 | D71 |
| 194 | 1 | 1 | | 1 | | 1 | 1 | 1 | | | 1 | | D72 |
| 195 | 1 | 1 | | 1 | | 1 | 1 | 1 | | | 1 | 1 | D73 |
| 196 | 1 | 1 | | 1 | | 1 | 1 | 1 | | 1 | | | D74 |
| 197 | 1 | 1 | | 1 | | 1 | 1 | 1 | | 1 | | 1 | D75 |
| 198 | 1 | 1 | | 1 | | 1 | 1 | 1 | | 1 | 1 | | D76 |
| 199 | 1 | 1 | | 1 | | 1 | 1 | 1 | | 1 | 1 | 1 | D77 |
| 200 | 1 | 1 | | 1 | | 1 | 1 | 1 | 1 | | | | D78 |
| 201 | 1 | 1 | | 1 | | 1 | 1 | 1 | 1 | | | 1 | D79 |
| 202 | 1 | 1 | | 1 | | 1 | 1 | 1 | 1 | | 1 | | D7A |
| 203 | 1 | 1 | | 1 | | 1 | 1 | 1 | 1 | | 1 | 1 | D7B |
| 204 | 1 | 1 | | 1 | | 1 | 1 | 1 | 1 | 1 | | | D7C |
| 205 | 1 | 1 | | 1 | | 1 | 1 | 1 | 1 | 1 | | 1 | D7D |
| 206 | 1 | 1 | | 1 | | 1 | 1 | 1 | 1 | 1 | 1 | | D7E |
| 207 | 1 | 1 | | 1 | | 1 | 1 | 1 | 1 | 1 | 1 | 1 | D7F |
| 208 | 1 | 1 | 1 | 1 | | | | 1 | 1 | | | | F18 |
| 209 | 1 | 1 | 1 | 1 | | | | 1 | 1 | | | 1 | F19 |
| 210 | 1 | 1 | 1 | 1 | | | | 1 | 1 | | 1 | | F1A |
| 211 | 1 | 1 | 1 | 1 | | | | 1 | 1 | | 1 | 1 | F1B |
| 212 | 1 | 1 | 1 | 1 | | | | 1 | 1 | 1 | | | F1C |
| 213 | 1 | 1 | 1 | 1 | | | | 1 | 1 | 1 | | 1 | F1D |
| 214 | 1 | 1 | 1 | 1 | | | | 1 | 1 | 1 | 1 | | F1E |
| 215 | 1 | 1 | 1 | 1 | | | | 1 | 1 | 1 | 1 | 1 | F1F |
| 216 | 1 | 1 | 1 | 1 | | 1 | 1 | 1 | | | | | F38 |
| 217 | 1 | 1 | 1 | 1 | | 1 | 1 | 1 | | | | 1 | F39 |
| 218 | 1 | 1 | 1 | 1 | | 1 | 1 | 1 | | | 1 | | F3A |
| 219 | 1 | 1 | 1 | 1 | | 1 | 1 | 1 | | | 1 | 1 | F3B |
| 220 | 1 | 1 | 1 | 1 | | 1 | 1 | 1 | | 1 | | | F3C |
| 221 | 1 | 1 | 1 | 1 | | 1 | 1 | 1 | | 1 | | 1 | F3D |
| 222 | 1 | 1 | 1 | 1 | | 1 | 1 | 1 | | 1 | 1 | | F3E |
| 223 | 1 | 1 | 1 | 1 | | 1 | 1 | 1 | | 1 | 1 | 1 | F3F |

FIG. 7 b

| Row | | | | | | | | | | | | Hex |
|---|---|---|---|---|---|---|---|---|---|---|---|---|
| 224 | 1 | 1 | 1 | 1 |   | 1 |   | 1 | 1 |   |   | F58 |
| 225 | 1 | 1 | 1 | 1 |   | 1 |   | 1 | 1 |   | 1 | F59 |
| 226 | 1 | 1 | 1 | 1 |   | 1 |   | 1 | 1 | 1 |   | F5A |
| 227 | 1 | 1 | 1 | 1 |   | 1 |   | 1 | 1 | 1 | 1 | F5B |
| 228 | 1 | 1 | 1 | 1 |   | 1 |   | 1 | 1 | 1 |   | F5C |
| 229 | 1 | 1 | 1 | 1 |   | 1 |   | 1 | 1 | 1 | 1 | F5D |
| 230 | 1 | 1 | 1 | 1 |   | 1 |   | 1 | 1 | 1 | 1 | F5E |
| 231 | 1 | 1 | 1 | 1 |   | 1 |   | 1 | 1 | 1 | 1 | F5F |
| 232 | 1 | 1 | 1 | 1 |   | 1 | 1 | 1 | 1 |   |   | F78 |
| 233 | 1 | 1 | 1 | 1 |   | 1 | 1 | 1 | 1 |   | 1 | F79 |
| 234 | 1 | 1 | 1 | 1 |   | 1 | 1 | 1 | 1 | 1 |   | F7A |
| 235 | 1 | 1 | 1 | 1 |   | 1 | 1 | 1 | 1 | 1 | 1 | F7B |
| 236 | 1 | 1 | 1 | 1 |   | 1 | 1 | 1 | 1 | 1 |   | F7C |
| 237 | 1 | 1 | 1 | 1 |   | 1 | 1 | 1 | 1 | 1 | 1 | F7D |
| 238 | 1 | 1 | 1 | 1 |   | 1 | 1 | 1 | 1 | 1 |   | F7E |
| 239 | 1 | 1 | 1 | 1 |   | 1 | 1 | 1 | 1 | 1 | 1 | F7F |
| 240 | 1 | 1 | 1 | 1 | 1 | 1 |   | 1 | 1 |   |   | FD8 |
| 241 | 1 | 1 | 1 | 1 | 1 | 1 |   | 1 | 1 |   | 1 | FD9 |
| 242 | 1 | 1 | 1 | 1 | 1 | 1 |   | 1 | 1 | 1 |   | FDA |
| 243 | 1 | 1 | 1 | 1 | 1 | 1 |   | 1 | 1 | 1 | 1 | FDB |
| 244 | 1 | 1 | 1 | 1 | 1 | 1 |   | 1 | 1 | 1 |   | FDC |
| 245 | 1 | 1 | 1 | 1 | 1 | 1 |   | 1 | 1 | 1 | 1 | FDD |
| 246 | 1 | 1 | 1 | 1 | 1 | 1 |   | 1 | 1 | 1 | 1 | FDE |
| 247 | 1 | 1 | 1 | 1 | 1 | 1 |   | 1 | 1 | 1 | 1 | FDF |
| 248 | 1 | 1 | 1 | 1 | 1 | 1 | 1 | 1 | 1 |   |   | FF8 |
| 249 | 1 | 1 | 1 | 1 | 1 | 1 | 1 | 1 | 1 |   | 1 | FF9 |
| 250 | 1 | 1 | 1 | 1 | 1 | 1 | 1 | 1 | 1 | 1 |   | FFA |
| 251 | 1 | 1 | 1 | 1 | 1 | 1 | 1 | 1 | 1 | 1 | 1 | FFB |
| 252 | 1 | 1 | 1 | 1 | 1 | 1 | 1 | 1 | 1 | 1 |   | FFC |
| 253 | 1 | 1 | 1 | 1 | 1 | 1 | 1 | 1 | 1 | 1 | 1 | FFD |
| 254 | 1 | 1 | 1 | 1 | 1 | 1 | 1 | 1 | 1 | 1 |   | FFE |
| 255 | 1 | 1 | 1 | 1 | 1 | 1 | 1 | 1 | 1 | 1 | 1 | FFF |

FIG.8 a

HIGH-FIGURE 4 BITS DIVIDED – A FIRST CONVERTING TABLE

| LUMINANCE LEVEL | IMPUT PIVEL DATA | | | | | | | | | | | | |
|---|---|---|---|---|---|---|---|---|---|---|---|---|---|
| | DB | DA | D9 | D8 | D7 | D6 | D5 | D4 | D3 | D2 | D1 | D0 | |
| | 64 | 64 | 32 | 32 | 16 | 16 | 8 | 8 | 8 | 4 | 2 | 1 | hex |
| 001 | | | | | | | | | | | | 1 | 001 |
| 002 | | | | | | | | | | | 1 | | 002 |
| 003 | | | | | | | | | | | 1 | 1 | 003 |
| 004 | | | | | | | | | | 1 | | | 004 |
| 005 | | | | | | | | | | 1 | | 1 | 005 |
| 006 | | | | | | | | | | 1 | 1 | | 006 |
| 007 | | | | | | | | | | 1 | 1 | 1 | 007 |
| 008 | | | | | | | | | 1 | | | | 008 |
| 009 | | | | | | | | | 1 | | | 1 | 009 |
| 010 | | | | | | | | | 1 | | 1 | | 00A |
| 011 | | | | | | | | | 1 | | 1 | 1 | 00B |
| 012 | | | | | | | | | 1 | 1 | | | 00C |
| 013 | | | | | | | | | 1 | 1 | | 1 | 00D |
| 014 | | | | | | | | | 1 | 1 | 1 | | 00E |
| 015 | | | | | | | | | 1 | 1 | 1 | 1 | 00F |
| 016 | | | | | | | | 1 | | 1 | | | 018 |
| 017 | | | | | | | | 1 | | 1 | | 1 | 019 |
| 018 | | | | | | | | 1 | | 1 | 1 | | 01A |
| 019 | | | | | | | | 1 | | 1 | 1 | 1 | 01B |
| 020 | | | | | | | | 1 | | 1 | 1 | | 01C |
| 021 | | | | | | | | 1 | | 1 | 1 | 1 | 01D |
| 022 | | | | | | | | 1 | | 1 | 1 | 1 | 01E |
| 023 | | | | | | | | 1 | | 1 | 1 | 1 | 01F |
| 024 | | | | | | | | 1 | 1 | 1 | | | 038 |
| 025 | | | | | | | | 1 | 1 | 1 | | 1 | 039 |
| 026 | | | | | | | | 1 | 1 | 1 | 1 | | 03A |
| 027 | | | | | | | | 1 | 1 | 1 | 1 | 1 | 03B |
| 028 | | | | | | | | 1 | 1 | 1 | 1 | | 03C |
| 029 | | | | | | | | 1 | 1 | 1 | 1 | 1 | 03D |
| 030 | | | | | | | | 1 | 1 | 1 | 1 | | 03E |
| 031 | | | | | | | | 1 | 1 | 1 | 1 | 1 | 03F |

FIG. 8 b

| | | | | | | | | | | | |
|---|---|---|---|---|---|---|---|---|---|---|---|
| 032 | | | | | 1 | | 1 | | 1 | | | 058 |
| 033 | | | | | 1 | | 1 | | 1 | | 1 | 059 |
| 034 | | | | | 1 | | 1 | | 1 | 1 | | 05A |
| 035 | | | | | 1 | | 1 | | 1 | 1 | 1 | 05B |
| 036 | | | | | 1 | | 1 | | 1 | 1 | | 05C |
| 037 | | | | | 1 | | 1 | | 1 | 1 | 1 | 05D |
| 038 | | | | | 1 | | 1 | | 1 | 1 | 1 | 05E |
| 039 | | | | | 1 | | 1 | | 1 | 1 | 1 | 1 | 05F |
| 040 | | | | 1 | 1 | | | | 1 | | | 0C8 |
| 041 | | | | 1 | 1 | | | | 1 | | 1 | 0C9 |
| 042 | | | | 1 | 1 | | | | 1 | 1 | | 0CA |
| 043 | | | | 1 | 1 | | | | 1 | 1 | 1 | 0CB |
| 044 | | | | 1 | 1 | | | | 1 | 1 | | 0CC |
| 045 | | | | 1 | 1 | | | | 1 | 1 | 1 | 0CD |
| 046 | | | | 1 | 1 | | | | 1 | 1 | 1 | 0CE |
| 047 | | | | 1 | 1 | | | | 1 | 1 | 1 | 1 | 0CF |
| 048 | | 1 | | 1 | | | | | | | | 140 |
| 049 | | 1 | | 1 | | | | | | | 1 | 141 |
| 050 | | 1 | | 1 | | | | | | 1 | | 142 |
| 051 | | 1 | | 1 | | | | | | 1 | 1 | 143 |
| 052 | | 1 | | 1 | | | | | 1 | | | 144 |
| 053 | | 1 | | 1 | | | | | 1 | | 1 | 145 |
| 054 | | 1 | | 1 | | | | | 1 | 1 | | 146 |
| 055 | | 1 | | 1 | | | | | 1 | 1 | 1 | 147 |
| 056 | | 1 | | 1 | | | 1 | | | | | 148 |
| 057 | | 1 | | 1 | | | 1 | | | | 1 | 149 |
| 058 | | 1 | | 1 | | | 1 | | | 1 | | 14A |
| 059 | | 1 | | 1 | | | 1 | | | 1 | 1 | 14B |
| 060 | | 1 | | 1 | | | 1 | | 1 | | | 14C |
| 061 | | 1 | | 1 | | | 1 | | 1 | | 1 | 14D |
| 062 | | 1 | | 1 | | | 1 | | 1 | 1 | | 14E |
| 063 | | 1 | | 1 | | | 1 | | 1 | 1 | 1 | 14F |

FIG.9 a

HIGH-FIGURE 4 BITS DIVIDED – A FIRST CONVERTING TABLE

| LUMINANCE LEVEL | IMPUT PIVEL DATA | | | | | | | | | | | |
|---|---|---|---|---|---|---|---|---|---|---|---|---|
| | DB | DA | D9 | D8 | D7 | D6 | D5 | D4 | D3 | D2 | D1 | D0 |
| | 64 | 64 | 32 | 32 | 16 | 16 | 8 | 8 | 8 | 4 | 2 | 1 | hex |
| 064 | | | 1 | | 1 | | 1 | | 1 | | | | 158 |
| 065 | | | 1 | | 1 | | 1 | | 1 | | | 1 | 159 |
| 066 | | | 1 | | 1 | | 1 | | 1 | | 1 | | 15A |
| 067 | | | 1 | | 1 | | 1 | | 1 | | 1 | 1 | 15B |
| 068 | | | 1 | | 1 | | 1 | | 1 | 1 | | | 15C |
| 069 | | | 1 | | 1 | | 1 | | 1 | 1 | | 1 | 15D |
| 070 | | | 1 | | 1 | | 1 | | 1 | 1 | 1 | | 15E |
| 071 | | | 1 | | 1 | | 1 | | 1 | 1 | 1 | 1 | 15F |
| 072 | | | 1 | | 1 | | 1 | 1 | 1 | | | | 178 |
| 073 | | | 1 | | 1 | | 1 | 1 | 1 | | | 1 | 179 |
| 074 | | | 1 | | 1 | | 1 | 1 | 1 | | 1 | | 17A |
| 075 | | | 1 | | 1 | | 1 | 1 | 1 | | 1 | 1 | 17B |
| 076 | | | 1 | | 1 | | 1 | 1 | 1 | 1 | | | 17C |
| 077 | | | 1 | | 1 | | 1 | 1 | 1 | 1 | | 1 | 17D |
| 078 | | | 1 | | 1 | | 1 | 1 | 1 | 1 | 1 | | 17E |
| 079 | | | 1 | | 1 | | 1 | 1 | 1 | 1 | 1 | 1 | 17F |
| 080 | | | 1 | 1 | | | 1 | 1 | | | | | 330 |
| 081 | | | 1 | 1 | | | 1 | 1 | | | | 1 | 331 |
| 082 | | | 1 | 1 | | | 1 | 1 | | | 1 | | 332 |
| 083 | | | 1 | 1 | | | 1 | 1 | | | 1 | 1 | 333 |
| 084 | | | 1 | 1 | | | 1 | 1 | | 1 | | | 334 |
| 085 | | | 1 | 1 | | | 1 | 1 | | 1 | | 1 | 335 |
| 086 | | | 1 | 1 | | | 1 | 1 | | 1 | 1 | | 336 |
| 087 | | | 1 | 1 | | | 1 | 1 | | 1 | 1 | 1 | 337 |
| 088 | | | 1 | 1 | | | 1 | 1 | 1 | | | | 338 |
| 089 | | | 1 | 1 | | | 1 | 1 | 1 | | | 1 | 339 |
| 090 | | | 1 | 1 | | | 1 | 1 | 1 | | 1 | | 33A |
| 091 | | | 1 | 1 | | | 1 | 1 | 1 | | 1 | 1 | 33B |
| 092 | | | 1 | 1 | | | 1 | 1 | 1 | 1 | | | 33C |
| 093 | | | 1 | 1 | | | 1 | 1 | 1 | 1 | | 1 | 33D |
| 094 | | | 1 | 1 | | | 1 | 1 | 1 | 1 | 1 | | 33E |
| 095 | | | 1 | 1 | | | 1 | 1 | 1 | 1 | 1 | 1 | 33F |

FIG.9 b

| Dec | c1 | c2 | c3 | c4 | c5 | c6 | c7 | c8 | c9 | c10 | Hex |
|---|---|---|---|---|---|---|---|---|---|---|---|
| 096 |   |   | 1 | 1 | 1 |   | 1 |   | 1 |   |   | 358 |
| 097 |   |   | 1 | 1 | 1 |   | 1 |   | 1 |   | 1 | 359 |
| 098 |   |   | 1 | 1 | 1 |   | 1 |   | 1 | 1 |   | 35A |
| 099 |   |   | 1 | 1 | 1 |   | 1 |   | 1 | 1 | 1 | 35B |
| 100 |   |   | 1 | 1 | 1 |   | 1 |   | 1 | 1 |   | 35C |
| 101 |   |   | 1 | 1 | 1 |   | 1 |   | 1 | 1 | 1 | 35D |
| 102 |   |   | 1 | 1 | 1 |   | 1 |   | 1 | 1 | 1 | 35E |
| 103 |   |   | 1 | 1 | 1 |   | 1 |   | 1 | 1 | 1 | 35F |
| 104 |   |   | 1 | 1 | 1 | 1 |   |   | 1 |   |   | 3C8 |
| 105 |   |   | 1 | 1 | 1 | 1 |   |   | 1 |   | 1 | 3C9 |
| 106 |   |   | 1 | 1 | 1 | 1 |   |   | 1 | 1 |   | 3CA |
| 107 |   |   | 1 | 1 | 1 | 1 |   |   | 1 | 1 | 1 | 3CB |
| 108 |   |   | 1 | 1 | 1 | 1 |   |   | 1 | 1 |   | 3CC |
| 109 |   |   | 1 | 1 | 1 | 1 |   |   | 1 | 1 | 1 | 3CD |
| 110 |   |   | 1 | 1 | 1 | 1 |   |   | 1 | 1 | 1 | 3CE |
| 111 |   |   | 1 | 1 | 1 | 1 |   |   | 1 | 1 | 1 | 3CF |
| 112 | 1 |   | 1 |   |   |   | 1 | 1 |   |   |   | 530 |
| 113 | 1 |   | 1 |   |   |   | 1 | 1 |   |   | 1 | 531 |
| 114 | 1 |   | 1 |   |   |   | 1 | 1 |   | 1 |   | 532 |
| 115 | 1 |   | 1 |   |   |   | 1 | 1 |   | 1 | 1 | 533 |
| 116 | 1 |   | 1 |   |   |   | 1 | 1 | 1 |   |   | 534 |
| 117 | 1 |   | 1 |   |   |   | 1 | 1 | 1 |   | 1 | 535 |
| 118 | 1 |   | 1 |   |   |   | 1 | 1 | 1 | 1 |   | 536 |
| 119 | 1 |   | 1 |   |   |   | 1 | 1 | 1 | 1 | 1 | 537 |
| 120 | 1 |   | 1 |   |   |   | 1 | 1 | 1 |   |   | 538 |
| 121 | 1 |   | 1 |   |   |   | 1 | 1 | 1 |   | 1 | 539 |
| 122 | 1 |   | 1 |   |   |   | 1 | 1 | 1 | 1 |   | 53A |
| 123 | 1 |   | 1 |   |   |   | 1 | 1 | 1 | 1 | 1 | 53B |
| 124 | 1 |   | 1 |   |   |   | 1 | 1 | 1 | 1 |   | 53C |
| 125 | 1 |   | 1 |   |   |   | 1 | 1 | 1 | 1 | 1 | 53D |
| 126 | 1 |   | 1 |   |   |   | 1 | 1 | 1 | 1 | 1 | 53E |
| 127 | 1 |   | 1 |   |   |   | 1 | 1 | 1 | 1 | 1 | 53F |

FIG.10 a

HIGH-FIGURE 4 BITS DIVIDED – A FIRST CONVERTING TABLE

| LUMINANCE LEVEL | INPUT PIXEL DATA | | | | | | | | | | | | |
|---|---|---|---|---|---|---|---|---|---|---|---|---|---|
| | DB | DA | D9 | D8 | D7 | D6 | D5 | D4 | D3 | D2 | D1 | D0 | |
| | 64 | 64 | 32 | 32 | 16 | 16 | 8 | 8 | 8 | 4 | 2 | 1 | hex |
| 128 |   | 1 |   | 1 | 1 | 1 |   |   |   |   |   |   | 5C0 |
| 129 |   | 1 |   | 1 | 1 | 1 |   |   |   |   |   | 1 | 5C1 |
| 130 |   | 1 |   | 1 | 1 | 1 |   |   |   |   | 1 |   | 5C2 |
| 131 |   | 1 |   | 1 | 1 | 1 |   |   |   |   | 1 | 1 | 5C3 |
| 132 |   | 1 |   | 1 | 1 | 1 |   |   |   | 1 |   |   | 5C4 |
| 133 |   | 1 |   | 1 | 1 | 1 |   |   |   | 1 |   | 1 | 5C5 |
| 134 |   | 1 |   | 1 | 1 | 1 |   |   |   | 1 | 1 |   | 5C6 |
| 135 |   | 1 |   | 1 | 1 | 1 |   |   |   | 1 | 1 | 1 | 5C7 |
| 136 |   | 1 |   | 1 | 1 | 1 |   | 1 |   |   |   |   | 5D0 |
| 137 |   | 1 |   | 1 | 1 | 1 |   | 1 |   |   |   | 1 | 5D1 |
| 138 |   | 1 |   | 1 | 1 | 1 |   | 1 |   |   | 1 |   | 5D2 |
| 139 |   | 1 |   | 1 | 1 | 1 |   | 1 |   |   | 1 | 1 | 5D3 |
| 140 |   | 1 |   | 1 | 1 | 1 |   | 1 |   | 1 |   |   | 5D4 |
| 141 |   | 1 |   | 1 | 1 | 1 |   | 1 |   | 1 |   | 1 | 5D5 |
| 142 |   | 1 |   | 1 | 1 | 1 |   | 1 |   | 1 | 1 |   | 5D6 |
| 143 |   | 1 |   | 1 | 1 | 1 |   | 1 |   | 1 | 1 | 1 | 5D7 |
| 144 |   | 1 |   | 1 | 1 | 1 | 1 | 1 |   |   |   |   | 5F0 |
| 145 |   | 1 |   | 1 | 1 | 1 | 1 | 1 |   |   |   | 1 | 5F1 |
| 146 |   | 1 |   | 1 | 1 | 1 | 1 | 1 |   |   | 1 |   | 5F2 |
| 147 |   | 1 |   | 1 | 1 | 1 | 1 | 1 |   |   | 1 | 1 | 5F3 |
| 148 |   | 1 |   | 1 | 1 | 1 | 1 | 1 |   | 1 |   |   | 5F4 |
| 149 |   | 1 |   | 1 | 1 | 1 | 1 | 1 |   | 1 |   | 1 | 5F5 |
| 150 |   | 1 |   | 1 | 1 | 1 | 1 | 1 |   | 1 | 1 |   | 5F6 |
| 151 |   | 1 |   | 1 | 1 | 1 | 1 | 1 |   | 1 | 1 | 1 | 5F7 |
| 152 |   | 1 |   | 1 | 1 | 1 | 1 | 1 | 1 |   |   |   | 5F8 |
| 153 |   | 1 |   | 1 | 1 | 1 | 1 | 1 | 1 |   |   | 1 | 5F9 |
| 154 |   | 1 |   | 1 | 1 | 1 | 1 | 1 | 1 |   | 1 |   | 5FA |
| 155 |   | 1 |   | 1 | 1 | 1 | 1 | 1 | 1 |   | 1 | 1 | 5FB |
| 156 |   | 1 |   | 1 | 1 | 1 | 1 | 1 | 1 | 1 |   |   | 5FC |
| 157 |   | 1 |   | 1 | 1 | 1 | 1 | 1 | 1 | 1 |   | 1 | 5FD |
| 158 |   | 1 |   | 1 | 1 | 1 | 1 | 1 | 1 | 1 | 1 |   | 5FE |
| 159 |   | 1 |   | 1 | 1 | 1 | 1 | 1 | 1 | 1 | 1 | 1 | 5FF |

FIG.10 b

| Index | c1 | c2 | c3 | c4 | c5 | c6 | c7 | c8 | c9 | c10 | c11 | c12 | Code |
|---|---|---|---|---|---|---|---|---|---|---|---|---|---|
| 160 | 1 | 1 |   |   | 1 | 1 |   |   |   |   |   |   | CC0 |
| 161 | 1 | 1 |   |   | 1 | 1 |   |   |   |   | 1 |   | CC1 |
| 162 | 1 | 1 |   |   | 1 | 1 |   |   |   | 1 |   |   | CC2 |
| 163 | 1 | 1 |   |   | 1 | 1 |   |   |   | 1 | 1 |   | CC3 |
| 164 | 1 | 1 |   |   | 1 | 1 |   |   | 1 |   |   |   | CC4 |
| 165 | 1 | 1 |   |   | 1 | 1 |   |   | 1 |   | 1 |   | CC5 |
| 166 | 1 | 1 |   |   | 1 | 1 |   |   | 1 | 1 |   |   | CC6 |
| 167 | 1 | 1 |   |   | 1 | 1 |   |   | 1 | 1 | 1 |   | CC7 |
| 168 | 1 | 1 |   |   | 1 | 1 |   | 1 |   |   |   |   | CC8 |
| 169 | 1 | 1 |   |   | 1 | 1 |   | 1 |   |   | 1 |   | CC9 |
| 170 | 1 | 1 |   |   | 1 | 1 |   | 1 |   | 1 |   |   | CCA |
| 171 | 1 | 1 |   |   | 1 | 1 |   | 1 |   | 1 | 1 |   | CCB |
| 172 | 1 | 1 |   |   | 1 | 1 |   | 1 | 1 |   |   |   | CCC |
| 173 | 1 | 1 |   |   | 1 | 1 |   | 1 | 1 |   | 1 |   | CCD |
| 174 | 1 | 1 |   |   | 1 | 1 |   | 1 | 1 | 1 |   |   | CCE |
| 175 | 1 | 1 |   |   | 1 | 1 |   | 1 | 1 | 1 | 1 | 1 | CCF |
| 176 | 1 | 1 |   |   | 1 | 1 | 1 |   | 1 |   |   |   | CD |
| 177 | 1 | 1 |   |   | 1 | 1 | 1 |   | 1 |   |   | 1 | CD9 |
| 178 | 1 | 1 |   |   | 1 | 1 | 1 |   | 1 |   | 1 |   | CDA |
| 179 | 1 | 1 |   |   | 1 | 1 | 1 |   | 1 |   | 1 | 1 | CDB |
| 180 | 1 | 1 |   |   | 1 | 1 | 1 |   | 1 | 1 |   |   | CDC |
| 181 | 1 | 1 |   |   | 1 | 1 | 1 |   | 1 | 1 |   | 1 | CDD |
| 182 | 1 | 1 |   |   | 1 | 1 | 1 |   | 1 | 1 | 1 |   | CDE |
| 183 | 1 | 1 |   |   | 1 | 1 | 1 |   | 1 | 1 | 1 | 1 | CDF |
| 184 | 1 | 1 |   |   | 1 | 1 | 1 | 1 | 1 |   |   |   | CF8 |
| 185 | 1 | 1 |   |   | 1 | 1 | 1 | 1 | 1 |   |   | 1 | CF9 |
| 186 | 1 | 1 |   |   | 1 | 1 | 1 | 1 | 1 |   | 1 |   | CFA |
| 187 | 1 | 1 |   |   | 1 | 1 | 1 | 1 | 1 |   | 1 | 1 | CFB |
| 188 | 1 | 1 |   |   | 1 | 1 | 1 | 1 | 1 | 1 |   |   | CFC |
| 189 | 1 | 1 |   |   | 1 | 1 | 1 | 1 | 1 | 1 |   | 1 | CFD |
| 190 | 1 | 1 |   |   | 1 | 1 | 1 | 1 | 1 | 1 | 1 |   | CFE |
| 191 | 1 | 1 |   |   | 1 | 1 | 1 | 1 | 1 | 1 | 1 | 1 | CFF |

FIG.11 a

HIGH-FIGURE 4 BITS DIVIDED – A FIRST CONVERTING TABLE

| LUMINANCE LEVEL | IMPUT PIVEL DATA | | | | | | | | | | | | |
|---|---|---|---|---|---|---|---|---|---|---|---|---|---|
| | DB | DA | D9 | D8 | D7 | D6 | D5 | D4 | D3 | D2 | D1 | D0 | |
| | 64 | 64 | 32 | 32 | 16 | 16 | 8 | 8 | 8 | 4 | 2 | 1 | hex |
| 192 | 1 | 1 | 1 | | 1 | | 1 | 1 | | | | | D70 |
| 193 | 1 | 1 | 1 | | 1 | | 1 | 1 | | | | 1 | D71 |
| 194 | 1 | 1 | 1 | | 1 | | 1 | 1 | | | 1 | | D72 |
| 195 | 1 | 1 | 1 | | 1 | | 1 | 1 | | | 1 | 1 | D73 |
| 196 | 1 | 1 | 1 | | 1 | | 1 | 1 | | 1 | | | D74 |
| 197 | 1 | 1 | 1 | | 1 | | 1 | 1 | | 1 | | 1 | D75 |
| 198 | 1 | 1 | 1 | | 1 | | 1 | 1 | | 1 | 1 | | D76 |
| 199 | 1 | 1 | 1 | | 1 | | 1 | 1 | | 1 | 1 | 1 | D77 |
| 200 | 1 | 1 | 1 | | 1 | | 1 | 1 | 1 | | | | D78 |
| 201 | 1 | 1 | 1 | | 1 | | 1 | 1 | 1 | | | 1 | D79 |
| 202 | 1 | 1 | 1 | | 1 | | 1 | 1 | 1 | | 1 | | D7A |
| 203 | 1 | 1 | 1 | | 1 | | 1 | 1 | 1 | | 1 | 1 | D7B |
| 204 | 1 | 1 | 1 | | 1 | | 1 | 1 | 1 | 1 | | | D7C |
| 205 | 1 | 1 | 1 | | 1 | | 1 | 1 | 1 | 1 | | 1 | D7D |
| 206 | 1 | 1 | 1 | | 1 | | 1 | 1 | 1 | 1 | 1 | | D7E |
| 207 | 1 | 1 | 1 | | 1 | | 1 | 1 | 1 | 1 | 1 | 1 | D7F |
| 208 | 1 | 1 | 1 | 1 | | | 1 | | 1 | | | | F18 |
| 209 | 1 | 1 | 1 | 1 | | | 1 | | 1 | | | 1 | F19 |
| 210 | 1 | 1 | 1 | 1 | | | 1 | | 1 | | 1 | | F1A |
| 211 | 1 | 1 | 1 | 1 | | | 1 | | 1 | | 1 | 1 | F1B |
| 212 | 1 | 1 | 1 | 1 | | | 1 | | 1 | 1 | | | F1C |
| 213 | 1 | 1 | 1 | 1 | | | 1 | | 1 | 1 | | 1 | F1D |
| 214 | 1 | 1 | 1 | 1 | | | 1 | | 1 | 1 | 1 | | F1E |
| 215 | 1 | 1 | 1 | 1 | | | 1 | | 1 | 1 | 1 | 1 | F1F |
| 216 | 1 | 1 | 1 | 1 | 1 | | 1 | 1 | 1 | | | | F38 |
| 217 | 1 | 1 | 1 | 1 | 1 | | 1 | 1 | 1 | | | 1 | F39 |
| 218 | 1 | 1 | 1 | 1 | 1 | | 1 | 1 | 1 | | 1 | | F3A |
| 219 | 1 | 1 | 1 | 1 | 1 | | 1 | 1 | 1 | | 1 | 1 | F3B |
| 220 | 1 | 1 | 1 | 1 | 1 | | 1 | 1 | 1 | 1 | | | F3C |
| 221 | 1 | 1 | 1 | 1 | 1 | | 1 | 1 | 1 | 1 | | 1 | F3D |
| 222 | 1 | 1 | 1 | 1 | 1 | | 1 | 1 | 1 | 1 | 1 | | F3E |
| 223 | 1 | 1 | 1 | 1 | 1 | | 1 | 1 | 1 | 1 | 1 | 1 | F3F |

FIG.11 b

| Dec |   |   |   |   |   |   |   |   |   |   |   |   | Hex |
|-----|---|---|---|---|---|---|---|---|---|---|---|---|-----|
| 224 | 1 | 1 | 1 | 1 | 1 |   | 1 |   | 1 |   |   |   | F58 |
| 225 | 1 | 1 | 1 | 1 | 1 |   | 1 |   | 1 |   |   | 1 | F59 |
| 226 | 1 | 1 | 1 | 1 | 1 |   | 1 |   | 1 |   | 1 |   | F5A |
| 227 | 1 | 1 | 1 | 1 | 1 |   | 1 |   | 1 |   | 1 | 1 | F5B |
| 228 | 1 | 1 | 1 | 1 | 1 |   | 1 |   | 1 | 1 |   |   | F5C |
| 229 | 1 | 1 | 1 | 1 | 1 |   | 1 |   | 1 | 1 |   | 1 | F5D |
| 230 | 1 | 1 | 1 | 1 | 1 |   | 1 |   | 1 | 1 | 1 |   | F5E |
| 231 | 1 | 1 | 1 | 1 | 1 |   | 1 |   | 1 | 1 | 1 | 1 | F5F |
| 232 | 1 | 1 | 1 | 1 | 1 |   | 1 | 1 | 1 |   |   |   | F78 |
| 233 | 1 | 1 | 1 | 1 | 1 |   | 1 | 1 | 1 |   |   | 1 | F79 |
| 234 | 1 | 1 | 1 | 1 | 1 |   | 1 | 1 | 1 |   | 1 |   | F7A |
| 235 | 1 | 1 | 1 | 1 | 1 |   | 1 | 1 | 1 |   | 1 | 1 | F7B |
| 236 | 1 | 1 | 1 | 1 | 1 |   | 1 | 1 | 1 | 1 |   |   | F7C |
| 237 | 1 | 1 | 1 | 1 | 1 |   | 1 | 1 | 1 | 1 |   | 1 | F7D |
| 238 | 1 | 1 | 1 | 1 | 1 |   | 1 | 1 | 1 | 1 | 1 |   | F7E |
| 239 | 1 | 1 | 1 | 1 | 1 |   | 1 | 1 | 1 | 1 | 1 | 1 | F7F |
| 240 | 1 | 1 | 1 | 1 | 1 | 1 | 1 |   | 1 |   |   |   | FD8 |
| 241 | 1 | 1 | 1 | 1 | 1 | 1 | 1 |   | 1 |   |   | 1 | FD9 |
| 242 | 1 | 1 | 1 | 1 | 1 | 1 | 1 |   | 1 |   | 1 |   | FDA |
| 243 | 1 | 1 | 1 | 1 | 1 | 1 | 1 |   | 1 |   | 1 | 1 | FDB |
| 244 | 1 | 1 | 1 | 1 | 1 | 1 | 1 |   | 1 | 1 |   |   | FDC |
| 245 | 1 | 1 | 1 | 1 | 1 | 1 | 1 |   | 1 | 1 |   | 1 | FDD |
| 246 | 1 | 1 | 1 | 1 | 1 | 1 | 1 |   | 1 | 1 | 1 |   | FDE |
| 247 | 1 | 1 | 1 | 1 | 1 | 1 | 1 |   | 1 | 1 | 1 | 1 | FDF |
| 248 | 1 | 1 | 1 | 1 | 1 | 1 | 1 | 1 | 1 |   |   |   | FF8 |
| 249 | 1 | 1 | 1 | 1 | 1 | 1 | 1 | 1 | 1 |   |   | 1 | FF9 |
| 250 | 1 | 1 | 1 | 1 | 1 | 1 | 1 | 1 | 1 |   | 1 |   | FFA |
| 251 | 1 | 1 | 1 | 1 | 1 | 1 | 1 | 1 | 1 |   | 1 | 1 | FFB |
| 252 | 1 | 1 | 1 | 1 | 1 | 1 | 1 | 1 | 1 | 1 |   |   | FFC |
| 253 | 1 | 1 | 1 | 1 | 1 | 1 | 1 | 1 | 1 | 1 |   | 1 | FFD |
| 254 | 1 | 1 | 1 | 1 | 1 | 1 | 1 | 1 | 1 | 1 | 1 |   | FFE |
| 255 | 1 | 1 | 1 | 1 | 1 | 1 | 1 | 1 | 1 | 1 | 1 | 1 | FFF |

(a)

(d)

(b)

(e)

(c)

(f)

FIRST FIELD

SECOND FIELD

HALF TONE DISPLAY METHOD FOR A DISPLAY PANEL

BACKGROUND OF THE INVENTION

The present invention relates to a method for displaying half tone for a display panel such as a plasma display panel (PDP) and a liquid crystal display (LCD) of a matrix display type. In the method, a unit display period (one frame or one field) is divided into a plurality of sub-frames corresponding to a display tone. The number of display pulses (discharge sustaining pulses) of each sub-frame is weighted corresponding to each bit.

Recently, as a display device becomes large in size, thickness of the display device is desired to be thin. Therefore, various types of display devices of thin thickness are provided. As one of the display devices, an ACPDP is known.

A conventional ACPDP comprises a plurality of data electrodes, and a plurality of row electrodes formed in pairs and disposed to intersect the data electrodes. A pair of row electrodes form one row (one scanning line) of an image. The data electrodes and the row electrodes are covered by dielectric layers respectively, at a discharge space. At the intersection of each of the data electrodes and each pair of row electrodes, a discharge cell (pixel) is formed.

As a method for displaying an image on the PDP by controlling a tone of the image, each frame (field) of a video signal is divided into N pieces of sub-frames (sub-fields), and each sub-frame (sub-field) emits the light for a time length corresponding to a weight applied to each bit of n-bit pixel data (sub-frame method).

In the method, if a pixel data for each pixel has 6 bits, each frame is divided into six sub-frames, SF1, SF2, ... SF6. The sub-frames SF1 to SF6 emit the light by sustaining discharge at 1 time, 2 times, 4 times, 8 times, 16 times and 32 times, respectively, in order. Thus, the tone of 64 steps can be obtained by combining the six sub-frames.

There are two cases in the PDP that, a video signal (interlace video signal) produced by the interlace scanning as used in the NTSC system is displayed, and that a video signal (non-interlace video signal) produced by the non-interlace scanning as used in the personal computer is displayed.

In the NTSC system, the interlace video signal is normally used for displaying a moving picture. On the other hand, in the personal computer, the non-interlace video signal is used for displaying the computer picture image which consists of a still picture without a moving picture or a moving picture without a still picture.

In order to display both of the still picture and the moving picture by the half tone display method, since the display order of the sub-frames is constant fixed), false contours are recognized irrespective of he still picture or the moving picture.

The false contour of the still picture is a flicker caused by brightness fluctuation with time of the same pixel (discharge cell). In the false contour of the moving picture, when an image is moved in plane on the PDP, false contours of bright stripes or dark stripes are recognized as if the tone of the image is lost near the area where the image crosses the border at the tone level of the n power of 2. Therefore, the quality of display is extremely deteriorated.

SUMMARY OF THE INVENTION

An object of the present invention is to provide a half tone display method for a display panel which may improve the quality of display in both of the still picture and the moving picture.

According to the present invention, there is provided a half tone display method for a display panel, wherein an input video signal is converted to pixel data, each of which comprises a plurality of bits, a unit display period of the input video signal is divided into a plurality of sub-frames, each of the sub-frames has a light emitting period corresponding to weight at a corresponding figure of the pixel data.

The method comprises the steps of discriminating kinds of the input video signal, disposing the sub-frames in such an arrangement that a sub-frame corresponding to a most heavy weight bit is located at a portion of the unit display period, sub-frames, each of which corresponds to a lighter weight bit than the most heavy weight bit, at positions before and after the most heavy sub-frame when the input video signal is discriminated as a still picture, dividing each of sub-frames which correspond to heavy weight bits including a most heavy weight bit into small sub-frames, and disposing the sub-frames in such an arrangement that small sub-frames corresponding to the most heavy weight bit are located at portions of the unit display period, small sub-frames, each of which corresponds to a lighter weight bit than the most heavy weight bit, at positions before and after the most heavy sub-frame when the input video signal is discriminated as a moving picture.

In an aspect of the present invention, the sub-frames are disposed in such an arrangement that a sub-frame corresponding to a most heavy weight bit is located at a central portion of the unit display period, sub-frames, each of which corresponds to a lighter weight bit than the most heavy weight bit, at positions before and after the most heavy sub-frame when the input video signal is discriminated as a still picture, each of sub-frames which correspond to heavy weight bits including a most heavy weight bit is divided into two small sub-frames, and the sub-frames are disposed in such an arrangement that small sub-frames corresponding to the most heavy weight bit are located at central portions of the unit display period, small sub-frames, each of which corresponds to a lighter weight bit than the most heavy weight bit, are symmetrically disposed at positions before and after the most heavy sub-frame in descending order of weight when the input video signal is discriminated as a moving picture.

The display panel is driven by line sequential scanning when the input video signal is discriminated as a still picture of non-interlace scanning.

The method further comprises driving neighboring two rows as one unit of scanning by line sequential scanning, and shifting the rows scanned at the same time by one row electrode in a first field when the input video signal is discriminated as a moving of interlace scanning.

These and other objects and features of the present invention will become more apparent from the following detailed description with reference to the accompanying drawings.

BRIEF DESCRIPTION OF DRAWINGS

FIGS. 4a to 7b show a first converting table of correcting data for the pixel;

FIGS. 8a to 11b show a second converting table of correcting data for the pixel;

DETAILED DESCRIPTION OF THE PREFERRED EMBODIMENT

Figure 1:
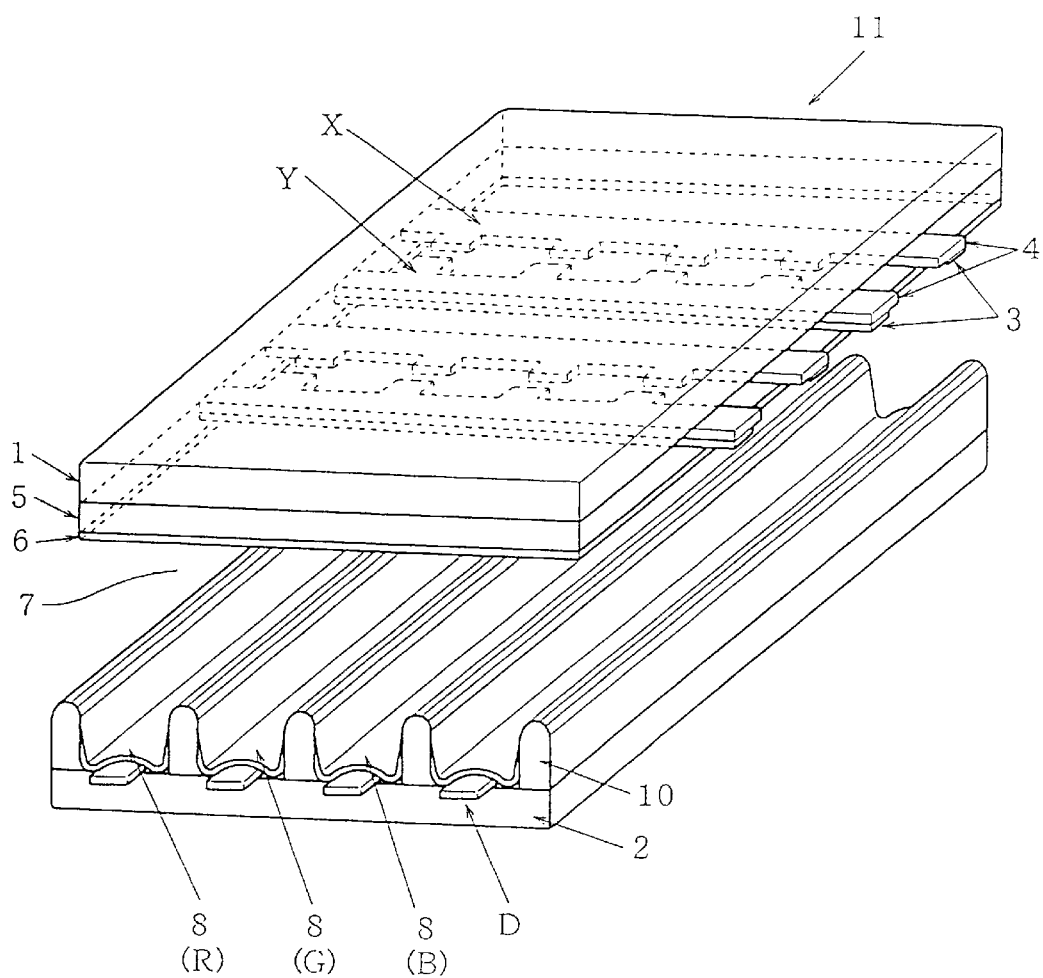
FIG. 1 is a schematic perspective view a plasma display panel according to the present invention.

FIG. 1 shows an ACPDP of a reflection type of three-electrode according to the present invention. An ACPDP 11 comprises a pair of glass substrates 1 and 2 disposed opposite to each other, interposing a discharge space 7 therebetween. The glass substrate 1 as a display portion has row electrodes (sustain electrodes) X and Y which are alternately disposed in pairs to be parallel with each other at the inside portion thereof. The row electrodes X and Y are covered by a dielectric layer 5 for producing wall charge. A protection layer 6 made of MgO is coated on the dielectric layer 5.

Each of the row electrodes X and Y comprises a transparent electrode 4 formed by a transparent conductive film having a large width and bus electrode (metallic electrode) 3 formed by a metallic film having a small width and layered on the transparent electrode 4.

On the glass substrate 2 as a rear member, a plurality of elongated barriers 10 are provided at the inside portion thereof for defining the discharge space 7. The barrier 10 extends in the direction perpendicular to the row electrodes X, Y. Between the barriers 10, data electrodes (address electrodes) D are formed to intersect the row electrodes X and Y of the glass substrate 1. A phosphor layer 8 having a predetermined luminous color R, G or B covers each of the data electrodes D and opposite side portions of the barrier 10. The discharge space 7 is filled with discharge gas consisting of neon mixed with xenon. Thus, a discharge cell (pixel) is formed at the intersection of the row electrodes in pairs and the data electrodes.

Figure 2:
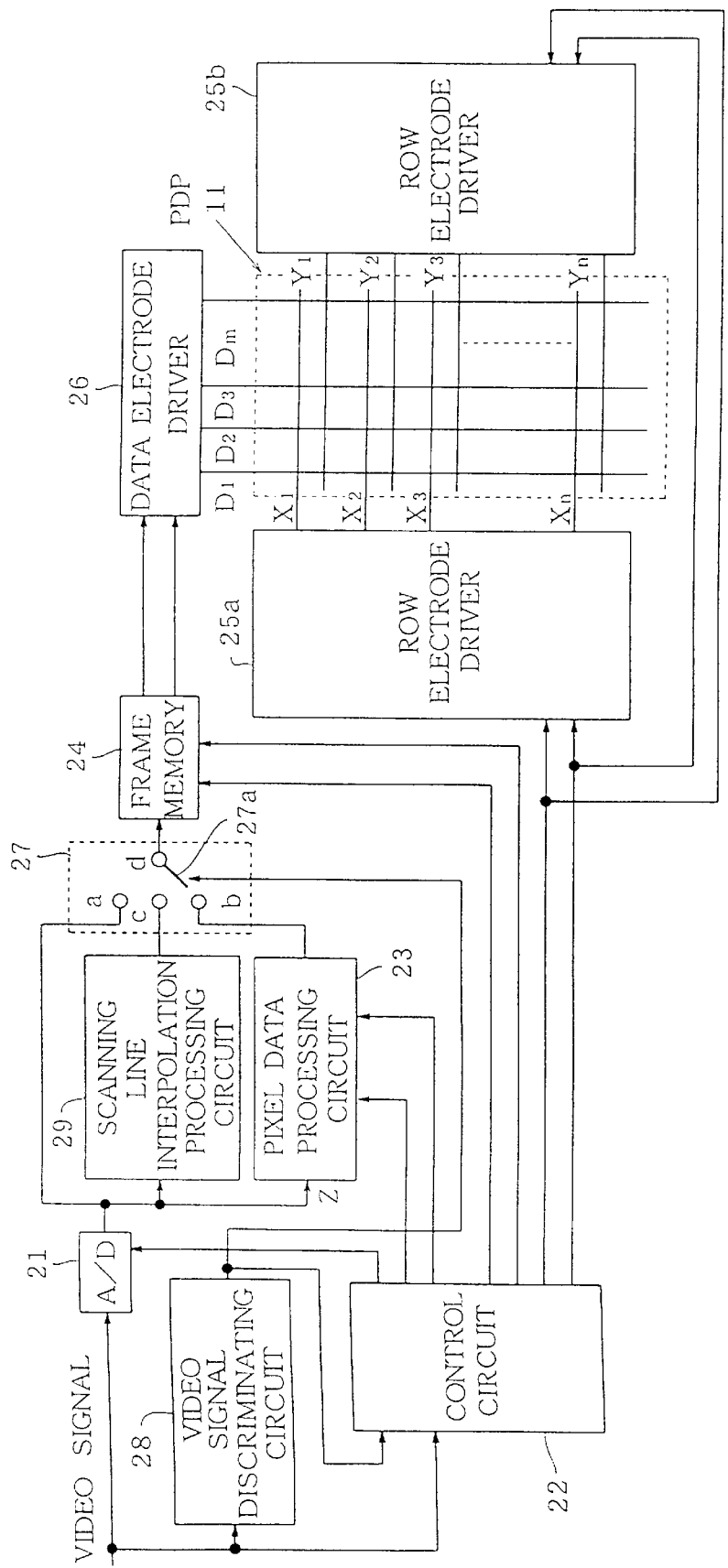
FIG. 2 is a block diagram showing a driving system for the plasma display panel.

Referring to FIG. 2 showing a driving system for displaying the half tone for the PDP 11, the driving system comprises a video signal discriminating circuit 28 applied with an input video signal for determining whether the input video signal is for a moving picture or a still picture and producing a first discriminating signal. The video signal is further determined whether it is produced by interlace scanning or non-interlace scanning. The video signal produced by the interlace scanning (as aforementioned, the interlace video signal used in the display of the NTSC system) is formed by N scanning lines of one frame (for example, 262.5 lines) at a first horizontal scanning frequency (for example, 15.75 kHz). The video signal produced by the non-interlace scanning (as aforementioned, the non-interlace video signal used in the display of the personal computer) is formed by M scanning lines of one frame (M>N, for example, 525 lines) at a second horizontal scanning frequency (for example, 31.5 kHz). The video signal discriminating circuit 28 produces a second discriminating signal. Furthermore, the video signal discriminating circuit 28 detects whether the input video signal is a fast moving picture or a slow moving picture when the video signal is a moving picture, and produces a moving detection signal. These first and second discriminating signals and the moving detection signal are applied to a control circuit 22.

Responsive to the first and second discriminating signals and the moving detection signal, the control circuit 22 produces a control signal which is applied to a frame memory 24.

The control circuit 22 is further applied with the video signal for extracting horizontal and vertical synchronizing signals. The control circuit 22 produces various timing signals for generating reset, scanning, sustaining and erasing signals corresponding to the horizontal and vertical synchronizing signals. The timing signals are applied to row electrode drivers 25a and 25b.

The control circuit 22 further produces clock signals such as a sampling clock signal and selection signals. The sampling clock signal is applied to an A/D converter 21.

The A/D converter 21 is further applied with the video signal such as interlace or non-interlace video signal and operated for sampling the input video signal to obtain a pixel data of n-bit (for example, 8 bits) for each pixel corresponding to the sampling clock signal from the control circuit 22. The pixel data is applied to a pixel data processing circuit 23.

The pixel data processing circuit 23 comprises a pixel data converting circuit. The pixel data converting circuit is applied with the clock signal, horizontal and vertical synchronizing signals and selection signal from the control circuit 22 for producing a false contour correcting pixel data. When the pixel data applied to the pixel data processing circuit 23 is for the moving picture, the circuit is operated to correct a false contour of the pixel data for the moving picture and produces a correcting pixel data of (n+m) bit (for example, 12 bits) for compensating the false contour. The false contour correcting pixel data is applied to a signal changeover selecting circuit 27.

A scanning line interpolation processing circuit 29 is operated to interpolate the scanning line of the input pixel data, thereby converting the interlace signal into the non-interlace pixel data. The converted signal is applied to the signal changeover selecting circuit 27.

The signal changeover selecting circuit 27 is a relay section and has three input terminals a, b and c, and one output terminal d having a movable contact 27a. The input terminal a is connected to the A/D converter 21, the input terminal b is connected to the pixel data processing circuit 23, and the input terminal c is connected to the scanning line interpolation processing circuit 29. The output terminal d is connected to the frame memory 24. The movable contact 27a is operated by the changeover signal from the control circuit 22 for selectively connecting one of the input terminals a–c to the output terminal d.

When the video signal is the non-interlace signal for the still picture or the moving picture signal of the slow movement, the movable contact 27a is operated to connect to the input terminal a. Thus, the pixel data from the A/D converter 21 is applied to the frame memory 24.

When the video signal is the moving picture signal of the fast movement, the movable contact 27a is operated to connect to the input terminal b. Thus, the false contour correcting pixel data of the pixel data processing circuit 23 is applied to the frame memory 24.

When the video signal is the interlace signal for the still picture, the movable contact 27a is operated to selectively connect to the input terminal c. Thus, the scanning line interpolated pixel data from the scanning line interpolation processing circuit 29 is applied to the frame memory 24.

The frame memory 24 is further applied with the control signal from the control circuit 22 for controlling writing address and reading address thereof, thereby changing allotments thereof.

The frame memory 24 is operated to store the pixel data in order in dependency on the write-in control signal from the control circuit 22, and to read the pixel data stored therein in dependency on the read-out control signal from the control circuit 22. The read-out pixel data is applied to a pixel data electrode driver 26.

The frame memory 24 reads the pixel data of the bit corresponding to each sub-frame in order in accordance with the display order of the sub-frame as described hereinafter.

The frame memory 24 has at least a capacity for storing the pixel data for one frame of the non-interlace video signal.

In the PDP 11, a pair of row electrodes X and Y are provided to form one row (one scanning line). The row electrodes X1-Xn are connected to the row electrode driver 25a. The row electrodes Y1-Yn are connected to the row electrode driver 25b.

The row electrode driver 25a produces a reset pulse for initializing wall charges of all of the discharge cells all at once, a scanning pulse (selecting and writing pulse or selecting and erasing pulse) for selectively forming or erasing the wall charge in dependency on the pixel data, thereby selecting a lighted pixel (cell) or unlighted pixel (cell), a sustaining pulse for sustaining the lighted pixel or unlighted pixel (namely, sustaining the discharge and emission of light), and an erasing pulse for erasing the wall charge of the discharge cell, corresponding to the timing signals from the control circuit 22. These pulses are applied to the row electrodes X1-Xn. The scanning pulse is sequentially applied from the row electrode X1 to the row electrode Xn in order.

The row electrode driver 25b produces a reset pulse for initializing wall charges of all of the discharge cells all at once, and a sustaining pulse for sustaining the lighted pixel or unlighted pixel (sustaining the discharge and emission of light), corresponding to the timing signals from the control circuit 22. These reset and sustaining pulses are applied to the row electrodes Y1-Yn at the respective timings.

The pixel data electrode driver 26 is connected to pixel data electrodes D1-Dm. The pixel data electrode driver 26 produces a pixel data pulse having voltage corresponding to the logic value "1" or "0" of each bit of the pixel data corresponding to the sub-frame which is applied from the frame memory 24. The pixel data pulse is applied to the pixel data electrodes D1-Dm.

Figure 3:
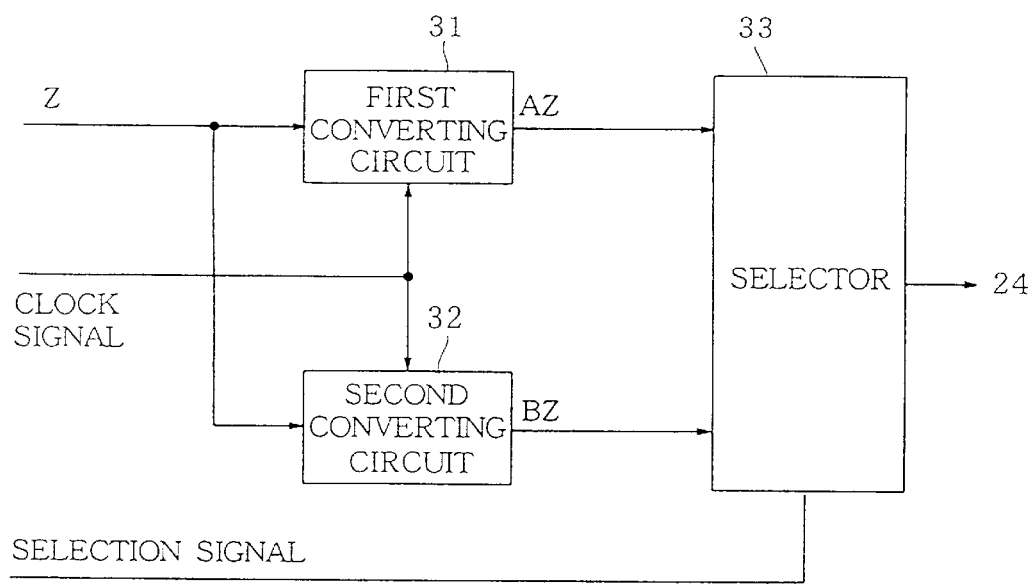
FIG. 3 is a block diagram showing a pixel data converting circuit provided in the driving system.

FIG. 3 shows the pixel data converting circuit of the pixel data processing circuit 23. The pixel data converting circuit comprises first and second converting circuits 31 and 32, and a selector 33.

The first data converting circuit 31 converts the pixel data Z of 8 bits applied from the A/D converter 21 to a correcting pixel data AZ of 12 bits of the corresponding luminance level in accordance with a first converting table as shown in FIGS. 4a to 7c. The correcting pixel data AZ is applied to the selector 33.

Similarly, the second data converting circuit 32 converts the pixel data Z of 8 bits to a correcting pixel data BZ of 12 bits of the corresponding luminance level in accordance with a second converting table of FIGS. 8a to 11c. The correcting pixel data BZ is applied to the selector 33.

The logic value "1" of each bit of the correcting pixel data AZ and BZ shown in FIGS. 4a to 7c and FIGS. 8a to 11c indicates the emission of light, and the logic value "0 (blank)" indicates the non-emission of light.

Figure 12:
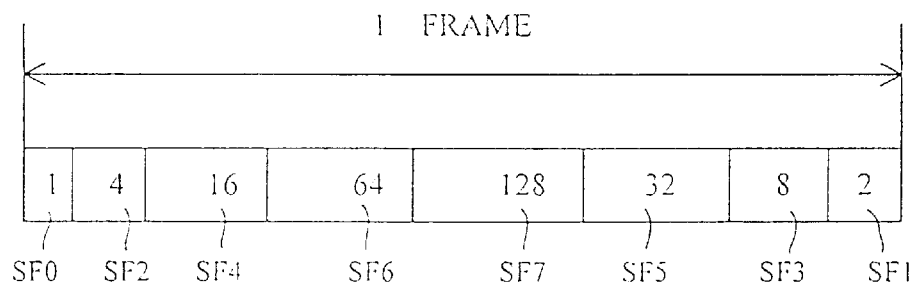
FIG. 12 is a diagram showing a light emitting format of sub-frames corresponding to eight bits in one frame.
Figure 13:
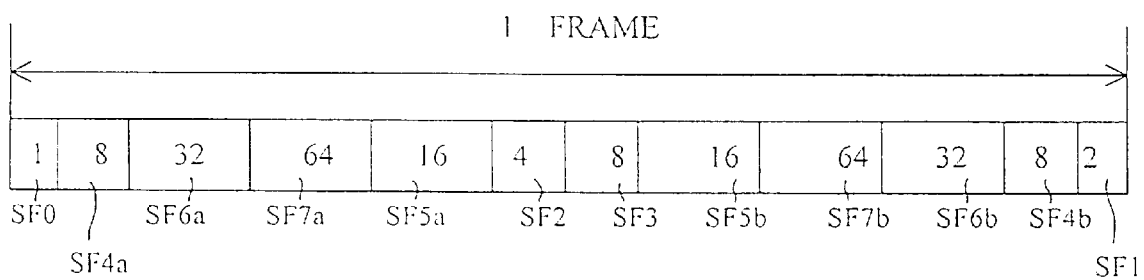
FIG. 13 is a diagram showing a light emitting format of sub-frames corresponding to twelve bits in one frame.

The light emitting period and figure position of each sub-frame in FIG. 12 shows a display period of one frame which is divided into eight sub-frames SF0 to SF7 corresponding to each bit figure of the pixel data of 8 bits. Then, in the eight sub-frames SF0 to SF7, the sub-frames SF4 to SF7 of high-figure 4 bits having the heavy weight are further divided into small sub-frames SF4a and SF4b, SF5a and SF5b, SF6a and SF6b, and SF7a and SF7b, respectively as shown in FIG. 13. Thus, the frame having twelve sub-frames SF0, SF1, SF2, SF3, SF4a, SF4b, SF5a, SF5b, SF6a, SF6b, SF7a, and SF7b is formed. This corresponds to twelve bits of pixel data AZ and BZ D0, D1, D2, D3, D4, D5, D6, D7, D8, D9, DA and DB. The sub-frames SF0 to SF7b emit light by sustaining discharge at 1 time, 2 times, 4 times, 8 times, 8 times, 8 times, 16 times, 16 times, 32 times, 32 times, 64 times and 64 times, respectively, in order.

The selector 33 selects one of the correcting pixel data AZ and BZ for each pixel corresponding to the selection signal from the control circuit 22 and produces the correcting pixel data which is applied to the frame memory 24.

In the embodiment, two converting patterns (light emitting patterns) are provided by the first and second converting tables. Each of the light emitting patterns has the same luminance level and the the same light emitting period of the sub-frames in one frame. However, the light emitting positions of the sub-frames are different from each other. Thus, the light emitting pattern is changed for each pixel, thereby reducing the false contour.

The half tone display method employed with the driving system of FIG. 2 will be described.

When the non-interlace video signal for the still picture is discriminated, the movable contact 27a is connected to the input terminal a in accordance with the changeover signal from the control circuit 22. Thus, the pixel data of 8 bits of the A/D converter 21 is applied to the frame memory 24 and stored therein as it is. The pixel data stored in the frame memory are read in accordance with the display order of FIG. 12.

In other words, the unit display period of one the sub-frames in the display period of each frame of input image signal is divided into eight periods corresponding to the pixel data of 8 bits. Namely, one frame is divided into eight sub-frames SF0 to SF7 as shown in FIG. 12 as aforementioned. The sub-frames SF0 to SF7b emit the light by sustaining discharge at 1 time, 2 times, 4 times, 8 times, 16 times, 32 times, 64 times and 128 times, respectively, in order. The display order of the sub-frames is SF0, SF2, SF4, SF6, SF7, SF5, SF3, and SF1. The sub-frame SF7 having the largest weight (the highest bit) is disposed in the central portion of the frame, and the other sub-frames SF6 to SF0 are separately disposed before and after the sub-frame SF7 in descending order of weight.

The data read from the frame memory 24 is applied to the pixel data driver 26. In display operation on the PDP, the PDP is driven by line sequential scanning.

When the interlace video signal for the still picture is discriminated, the movable contact 27a is manually connected to the input terminal a or c in accordance with the changeover signal from the control circuit 22. Thus, the pixel data of 8 bits of the A/D converter 21 or the scanning line interpolation processing circuit 29 is applied to the frame memory 24 and stored therein as it is. The bit data corresponding to the sub-frames are read in order so as to obtain the display order of the sub-frames in the display period of each frame shown in FIG. 12.

In display operation, in accordance with the pixel data from the A/D converter 21, the two row electrodes are written at the same time as aforementioned. By the pixel data from the scanning line interpolation processing circuit 29, the PDP is driven by line sequential scanning.

On the other hand, when the non-interlace video signal for the moving picture of the slow movement is discriminated, the movable contact 27a is connected to the input terminal a in accordance with the selection signal from the control circuit 22. Thus, the pixel data of 8 bits of the A/D converter 21 is applied to the frame memory 24 and stored therein as it is.

The bit data corresponding to the sub-frames are read in order so as to obtain the display order of the sub-frames in the display period of each frame shown in FIG. 13. In display operation, the two row electrodes are written at the same time. When the pixel data is stored in the frame memory, the writing address is controlled so as to compress the pixel data half in the vertical direction (thinning out).

As shown in FIG. 13, the display order of the sub-frames is SF0, SF4a, SF6a, SF7a, SF5a, SF2, SF3, SF5b, SF7b, SF6b, SF4b, and SF1. The divided sub-frames SF4a to SF7a and SF4b to SF7b are symmetrically disposed at the center of the frame, while the sub-frames SF7a and SF7b each of which has the largest weight (the highest bit) are disposed in the central portions of the opposite sides. The other divided sub-frames SF4a to SF6a and SF4b to SF6b are separately disposed before and after the respective sub-frames SF7a and SF7b in descending order of weight.

When the interlace video signal for the moving picture of a slow movement is discriminated, the movable contact 27a is connected to the input terminal a in accordance with the selection signal from the control circuit 22. Thus, the pixel data of 8 bits of the A/D converter 21 is applied to the frame memory 24 and stored therein as it is.

The bit data corresponding to the sub-frames are read in order so as to obtain the display order of the sub-frames in the display period of each frame shown in FIG. 13. In display operation, the two row electrodes are written at the same time.

When the non-interlace video signal for the moving picture of a fast movement is discriminated, the movable contact 27a of the signal changeover selecting circuit 27 is connected to the input terminal b in accordance with the selection signal from the control circuit 22. Thus, the false contour correcting pixel data of 12 bits of the pixel data processing circuit 23 is applied to the frame memory 24 and stored therein as it is.

The bit data corresponding to the sub-frames are read in order so as to obtain the display order of the sub-frames in the display period of each frame shown in FIG. 13. In display operation, the two row electrodes are written at the same time. When the pixel data is stored in the frame memory, the writing address is controlled so as to compress the pixel data half in the vertical direction (thinning out).

When the interlace video signal for the moving picture of fast movement is discriminated, the movable contact 27a of the signal changeover selecting circuit 27 is connected to the input terminal b in accordance with the selection signal from the control circuit 22. Thus, the false contour correcting pixel data of 12 bits of the pixel data processing circuit 23 is applied to the frame memory 24 and stored therein as it is.

The bit data corresponding to the sub-frames are read in order so as to obtain the display order of the sub-frames in the display period of each frame shown in FIG. 13. In display operation, the two row electrodes are written at the same time.

In order to display the video signal for the moving picture of fast movement, a plurality of light emitting patterns which have the same light emitting period and a different position for emitting the light may be provided. If the light emitting pattern of each pixel is changed, the false contour can be reduced.

The frame memory 24 reads out the pixel data stored therein from the first line to the sequential line in order at each display period of the sub-frame. The read pixel data is applied to the data electrode driver 26 as the pixel data driving data.

In order to display the video signal for the moving picture on the PDP, sequential two row electrodes (X1, Y1 and X2, Y2) are driven as one scanning unit by the line sequential scanning, while one scanning unit of the row electrodes which are driven at the same time is shifted by one row electrode in a first field (odd number field) and a second field (even number field) respectively as shown in FIGS. 14a to 14f.

Figure 14:
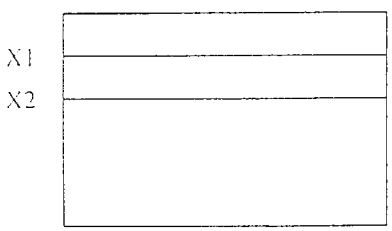
FIGS. 14a to 14f are diagrams showing first and second fields for explaining the moving of row electrodes.
Figure 14:
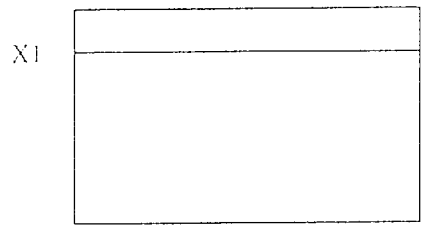
Figure 14:
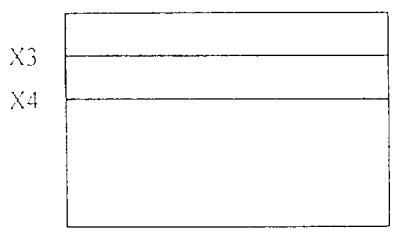
Figure 14:
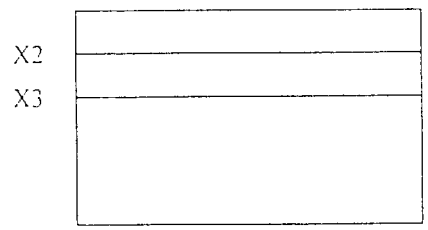
Figure 14:
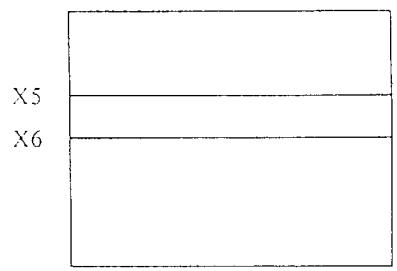
Figure 14:
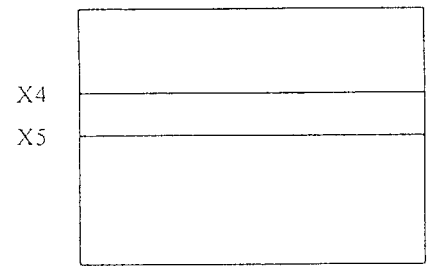

FIGS. 14a to 14c show row electrodes in the first field selected for scanning to write the data every horizontal scanning period. FIGS. 14d to 14f show row electrodes in the second field selected for scanning to write the data every horizontal scanning period. In the horizontal scanning period, the same data is written on the two rows (neighboring two row electrodes).

From the foregoing, in the interlace video signal for the moving picture, the pixel data are written on the two row electrodes at the same time. Thus, the amount of pixel data is reduced half compared with the non-interlace video signal, and the address period is also reduced half. Therefore, even if the number of sub-frames is increased for reducing the false contour, it is not necessary to increase the capacity of the frame memory 24.

In the non-interlace video signal for the moving picture, the number of scanning lines is compressed, and the two row electrodes are written at the same time. Thus, the amount of pixel data is reduced half compared with the non-interlace video signal for the still picture, and the address period is also reduced half. Therefore, the capacity of the frame memory 24 is prevented from increasing.

If the number of sub-frames (bit number) is increased, the number of tones can be increased from 64 tones (6 bits) to 256 tones (8 bits). Furthermore, by using a surplus capacity of the memory, the pixel data can be temporarily stored therein.

In the half tone display method, the video signal for the moving picture or the still picture is discriminated. The video signal only for the moving picture is processed to the false contour correction. Alternatively, the user may manually operate to select whether the false contour correction is processed to the input video signal (and two row electrodes are driven at the same time) or not.

In the method, if the video signal for the moving picture of fast movement is discriminated, a plurality of light emitting patterns which have the same light emitting period and a different position for emitting the light may be provided for changing the light emitting pattern of each pixel. Alternatively, in the case of the video signal for the moving picture irrespective of the speed of movement, one of the false contour correcting processes for the fast movement and the slow movement may be uniformly employed.

In the embodiment, although the driving system is applied to the ACPDP of the reflection type of three-electrode, the driving system of the present invention can be applied to other types of PDP such as a DCPDP.

In accordance with the present invention, the false contour correction is processed only to the video signal for the moving picture. Thus, the capacity of the memory is prevented from increasing, and the quality of display is increased.

In display operation, when the interlace video signal for the moving picture is discriminated, sequential two row electrodes are driven as one scanning unit by line sequential scanning, while the row electrodes of one scanning unit which are driven in the first and second fields at the same time are scanned to be shifted by one row electrode. Thus, the scanning period for writing is shortened, thereby obtaining time for increasing the sub-frames for the false contour correcting process.

In the non-interlace video signal for the still picture, the PDP is driven by line sequential scanning. Thus, the quality of display is prevented.

When the video signal for the moving picture is discriminated, a plurality of light emitting patterns which have the same light emitting period and a different position for emitting the light may be provided for changing the light emitting pattern of each pixel. Thus, in the moving picture of the fast movement, the false contour is further reduced.

While the invention has been described in conjunction with preferred specific embodiment thereof, it will be understood that this description is intended to illustrate and not limit the scope of the invention, which is defined by the following claims.

What is claimed is:

1. A half tone display method for a display panel, wherein an input video signal is converted to pixel data, each of which comprises a plurality of bits, a unit display period of the input video signal is divided into a plurality of sub-frames, each of the sub-frames has a light emitting period corresponding to weight at a corresponding figure of the pixel data, comprising the steps of:

discriminating kinds of the input video signal;

disposing the sub-frames in such an arrangement that a sub-frame corresponding to a most heavy weight bit is located at a portion of the unit display period, and that sub-frames, each of which corresponds to a lighter weight bit than the most heavy weight bit, are located at positions before and after the most heavy sub-frame when the input video signal is discriminated as a still picture;

dividing each of sub-frames which correspond to heavy weight bits including a most heavy weight bit into small sub-frames;

disposing the sub-frames in such an arrangement that small sub-frames corresponding to the most heavy weight bit are located at portions of the unit display period, and that small sub-frames, each of which corresponds to a lighter weight bit than the most heavy weight bit, are located at positions before and after the most heavy sub-frame when the input video signal is discriminated as a moving picture; and driving the display panel by line sequential scanning when the input video signal is discriminated as a still picture of non-interlace scanning.

2. The method according to claim 1 wherein the sub-frames are disposed in such an arrangement that a sub-frame corresponding to a most heavy weight bit is located at a central portion of the unit display period, and sub-frames, each of which corresponds to a lighter weight bit than the most heavy weight bit, are disposed at positions before and after the most heavy sub-frame when the input video signal is discriminated as a still picture;

each of sub-frames which correspond to heavy weight bits including a most heavy weight bit is divided into two small sub-frames; and the sub-frames are disposed in such an arrangement that small sub-frames corresponding to the most heavy weight bit are located at central portions of the unit display period, and small sub-frames, each of which corresponds to a lighter weight bit than the most heavy weight bit, are symmetrically disposed at positions before and after the most heavy sub-frame in descending order of weight when the input video signal is discriminated as a moving picture.

3. The method according to claim 1 further comprising driving neighboring two rows as one unit of scanning by line sequential scanning, and shifting the rows scanned at the same time by one row electrode in a first field when the input video signal is discriminated as a moving picture of interlace scanning.

4. The method according to claim 1 further comprising providing a plurality of light emitting patterns in which light emitting positions each having the same light emitting period are different from each other, and changing the light emitting patterns at every pixel.

* * * * *